Feb. 10, 1925.
B. R. CHARLES
1,525,915
HEATING DEVICE
Filed Nov. 26, 1923
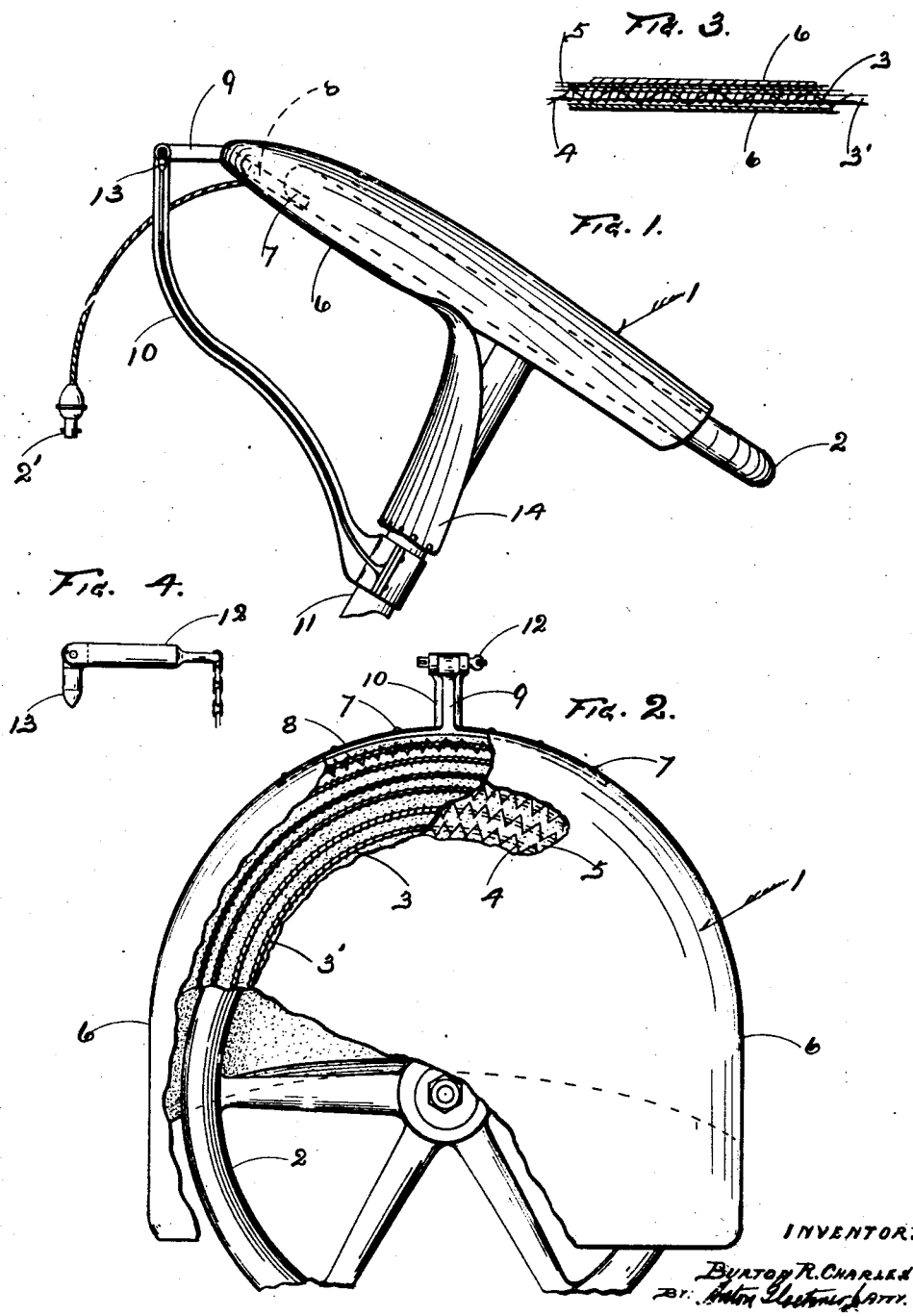
INVENTOR.
Burton R. Charles Patented Feb. 10, 1925.

1,525,915

UNITED STATES PATENT OFFICE.

BURTON R. CHARLES, OF LOS ANGELES, CALIFORNIA.

HEATING DEVICE.

Application filed November 26, 1923. Serial No. 677,099.

*To all whom it may concern:*

Be it known that I, BURTON R. CHARLES, a citizen of the United States, and residing at Los Angeles, county of Los Angeles, and State of California, have invented a certain new and useful Heating Device, of which the following is a specification.

My invention relates to a means for producing heat for use in motor vehicles and it has especial reference to a convenient and efficient contrivance that may be associated with a source of electrical energy in a motor vehicle for generating and confining heat within a definite area for the personal comfort of the occupants of the vehicle.

The main object of the invention is to provide a source of warmth for the driver of a motor car and particularly for his hands, and a further object of the invention is to provide a heat producing means which may be conveniently and readily attached to and detached from the steering wheel of an automobile, and which may be so positioned with relation to a steering wheel or other part of a vehicle, that freedom of movement of the hands shall at no time be impaired.

Other objects will appear from the specification following in connection with the accompanying drawing, which illustrates a form of the invention and a method of applying same, and in which—

Fig. 1 is a fragmentary side elevation, showing my invention as applied to a steering wheel, with a means for supporting same in position.

Fig. 2 is a fragmentary plan view of a steering wheel, showing the warming device in place, and means for detachably securing the device in place.

Fig. 3 is a fragmentary section showing the construction of the warming device, and Fig. 4 is a detail of a device for temporarily holding in place the warming device.

The invention generically considered, comprises an envelope, hood or other suitable enclosure containing a source of heat producing means and arranged for application to a steering wheel or other part of a motor vehicle. In its specific sense, the invention is shown as consisting of an envelope, cowl or enclosure 1, formed to encircle freely the major circumference of a steering wheel 2, and open at one end or side to receive the hands of the user, and containing, between suitable layers herein-after mentioned, a strand or strands of wire 3, having electrical resistance for producing heat, and wound about a twine or other flexible core 3'. The wire 3 is connected, by means of a suitable connector 2', to a source of electrical energy, not shown, and is sewed by threads 4, or otherwise fastened, to a layer 5 of canvas, burlap or suitable fabric, which is enclosed in a cover 6 of any desirable material, but preferably of one that will conserve the heat and resist penetration by moisture, as leather or a waterproof material. This cover is sewed or fastened at all points to enclose completely the heating wires. Associated with the envelope or enclosure 1, by a convenient means as threads, rivets 7, or the like, and preferably with that part of the same opposite the opening therein is a band 8, having a centrally projecting finger 9, provided with a lateral opening. This finger 9 is arranged for attachment to a suitable support 10, connected to and extending away from the steering post 11, by a pin 12, a portion 13, of which may be hingedly connected whereby to prevent accidental dislodgment and permit easy and quick removal of same.

A portion 14, of the envelope 1, may be left unattached to the envelope proper, and this portion 14, may constitute a flap or dependent portion or shield, which may be of sufficient extent to protect the lower part of the body of the driver. By any means, this flap or shield portion may be fastened to the steering post, or it may be provided with means for enabling other appurtenant complements of the envelope to be attached.

What I claim, is:

1. A heating device comprising an envelope containing a heating medium and arranged to cover part of the body, and means for associating the envelope with a part of a motor vehicle.

2. A heating device comprising a flexible envelope containing an electrical heating means and formed to accommodate a part of the body, and means to support the envelope.

3. A means for heating, comprising a cover formed to envelop the hands and containing electrical resistance wires connected with a source of electrical energy, and means for associating said cover with a motor vehicle.

4. A means for supplying heat, comprising a cover formed to envelop the steering wheel of a motor vehicle and accommodate the hands, and composed of textile material sewed together with interposed electrical resistance means connected with a source of electrical energy, and means for supporting said cover relatively to a motor vehicle.

5. A heating means comprising an envelope for the hands, said envelope provided with a depending portion, and resistance wires enclosed in said envelope and connected to a source of electrical energy for heating said envelope.

6. A heating means comprising an envelope formed to extend over the steering wheel of an automobile and to protect the hands, said envelope containing means for electrically heating the same and having a dependent flap also containing a heating means, and means for supporting the envelope in place.

7. A heating device comprising an envelope containing an electrical heating means and adapted to enclose a steering wheel and to receive the hands, and means for supporting said envelope.

8. A heating device comprising a strand of electrical resistance wire connected with a source of electrical energy for producing heat and attached to a suitable flexible support, and an envelope for enclosing said support, said envelope formed for association with a motor vehicle.

9. A heating device comprising a strand of resistance wire connected with a source of electrical energy for producing heat, and a moisture-proof and resistant envelope for enclosing said support, said envelope formed to receive the hands, and means for supporting said envelope relatively to a motor vehicle.

In testimony whereof I have set my hand.

BURTON R. CHARLES.